(12) United States Patent
Du

(10) Patent No.: US 7,013,552 B2
(45) Date of Patent: Mar. 21, 2006

(54) METHOD FOR FORMING AN ARMATURE FOR AN ELECTRIC MOTOR FOR A PORTABLE POWER TOOL

(75) Inventor: Hung T. Du, Reisterstown, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/365,065

(22) Filed: Feb. 12, 2003

(65) Prior Publication Data

US 2004/0012271 A1 Jan. 22, 2004

Related U.S. Application Data

(60) Division of application No. 09/836,517, filed on Apr. 17, 2001, now abandoned, which is a continuation-in-part of application No. 09/756,959, filed on Jan. 9, 2001, now abandoned.

(51) Int. Cl.
*H02K 15/00* (2006.01)
*H02K 1/04* (2006.01)

(52) U.S. Cl. .............................. 29/596; 29/598; 310/43; 264/272.19

(58) Field of Classification Search .................. 29/596, 29/598, 597, 605; 310/43, 45, 62, 63, 214, 310/215, 270; 264/272.19, 272.2, 272.15, 264/272.13
See application file for complete search history.

(56) References Cited

U.S. PATENT DOCUMENTS

| 1,619,415 A | 3/1927 | Gomory |
|---|---|---|
| 1,642,057 A | 9/1927 | Apple |
| 1,888,211 A | 11/1932 | Apple |
| 1,888,613 A | 11/1932 | Apple |
| 2,019,064 A | 10/1935 | Apple |
| 2,232,812 A | 2/1941 | Studer |
| 2,381,533 A | 8/1945 | Forss |
| 2,618,757 A | 11/1952 | Wieseman et al. |
| 2,683,233 A | 7/1954 | Ruhl |

(Continued)

FOREIGN PATENT DOCUMENTS

DE        32 09 864        9/1983

(Continued)

OTHER PUBLICATIONS

International Search Report for PCT/US03/21544 filed Jul. 10, 2003.

(Continued)

*Primary Examiner*—A. Dexter Tugbang
*Assistant Examiner*—Tai Van Nguyen
(74) *Attorney, Agent, or Firm*—Harness, Dickey & Pierce, P.L.C.

(57) ABSTRACT

An electric motor having an armature which includes a coating of thermally conductive plastic applied in a conventional injection molding process. The armature also includes a fan which is integrally formed from the thermally conductive plastic applied to the armature. This completely eliminates the need to apply one or more coatings of a trickle resin to the armature. It also eliminates the need to separately form and secure a fan by a suitable adhesive to the armature, which together significantly simplifies the manufacturing and cost of the armature. The plastic coating also better fills the spaces between the magnet wires, thus promoting even more efficient cooling and better holding of the magnet wires stationary relative to one another. The thermally conductive plastic coating may be mixed with other suitable materials to provide a density approximately equal to the magnet wires. This eliminates the need to balance the armature after the injection molding step.

12 Claims, 1 Drawing Sheet

U.S. PATENT DOCUMENTS

| | | | |
|---|---|---|---|
| 2,747,119 A | 5/1956 | Petersen et al. | |
| 2,756,354 A | 7/1956 | Baron | |
| 2,820,914 A | 1/1958 | Rudoff et al. | |
| 2,822,483 A | 2/1958 | De Jean et al. | |
| 2,914,600 A | 11/1959 | Smith et al. | |
| 2,937,408 A | 5/1960 | Limpel | |
| 2,944,297 A | 7/1960 | Maynard | |
| 2,949,555 A | 8/1960 | Paul | |
| 2,967,960 A | 1/1961 | Waldschmidt | |
| 2,997,776 A | 8/1961 | Matter et al. | |
| 3,047,756 A | 7/1962 | Coggeshall | |
| 3,151,262 A | 9/1964 | Howard et al. | |
| 3,182,383 A | 5/1965 | Rosenberg et al. | |
| 3,212,170 A | 10/1965 | Marshall | |
| 3,213,307 A | 10/1965 | Summerfield | |
| 3,244,919 A | 4/1966 | Drenth et al. | |
| 3,388,458 A | 6/1968 | Logan | |
| 3,407,491 A | 10/1968 | Clevenger et al. | |
| 3,427,264 A | 2/1969 | Forster et al. | |
| 3,436,815 A | 4/1969 | Sheets | |
| 3,468,020 A | 9/1969 | Carlson et al. | |
| 3,471,731 A | 10/1969 | Pratt et al. | |
| 3,477,125 A | 11/1969 | Schwartz | |
| 3,555,316 A | 1/1971 | Bleich | |
| 3,588,560 A | 6/1971 | Akselsen | |
| 3,638,055 A | 1/1972 | Zimmermann | |
| 3,672,039 A | 6/1972 | Arnold | |
| 3,688,137 A | 8/1972 | Filhol | |
| 3,697,792 A | 10/1972 | Roue | |
| 3,709,457 A | 1/1973 | Church | |
| 3,737,988 A | 6/1973 | Bednarski | |
| 3,758,799 A | 9/1973 | Dochterman et al. | |
| 3,772,452 A | 11/1973 | Usowski | |
| 3,813,294 A | 5/1974 | Dyer et al. | |
| 3,813,763 A | 6/1974 | Church | |
| 3,824,684 A * | 7/1974 | Wheeler | 29/596 |
| 3,859,400 A | 1/1975 | Ma | |
| 3,860,744 A | 1/1975 | Schuler | |
| 3,874,073 A | 4/1975 | Dochterman et al. | |
| 3,893,792 A | 7/1975 | Laczko | |
| 3,911,299 A | 10/1975 | Kristen et al. | |
| 3,911,563 A | 10/1975 | Anderson | |
| 3,932,083 A | 1/1976 | Boettner | |
| 3,939,020 A | 2/1976 | Caramanian et al. | |
| 3,963,949 A | 6/1976 | Church | |
| 3,971,132 A * | 7/1976 | Griffies et al. | 30/393 |
| 3,991,152 A | 11/1976 | Santi et al. | |
| 4,038,741 A | 8/1977 | Schuler | |
| 4,066,606 A | 1/1978 | Vargiu et al. | |
| 4,077,939 A | 3/1978 | Paparatto et al. | |
| 4,083,735 A | 4/1978 | Caramanian | |
| 4,087,712 A | 5/1978 | Mosimann et al. | |
| 4,102,973 A | 7/1978 | Hanning | |
| 4,105,906 A | 8/1978 | Ade et al. | |
| 4,128,527 A | 12/1978 | Kinjo | |
| 4,152,103 A | 5/1979 | Napierski | |
| 4,159,562 A | 7/1979 | Liptak et al. | |
| 4,160,926 A | 7/1979 | Cope et al. | |
| 4,219,748 A | 8/1980 | Sakaguchi et al. | |
| 4,235,656 A | 11/1980 | Shimada et al. | |
| 4,263,711 A | 4/1981 | Sakano et al. | |
| 4,322,647 A * | 3/1982 | Neroda et al. | 310/71 |
| 4,341,972 A | 7/1982 | Penn et al. | |
| 4,349,760 A | 9/1982 | Diepers | |
| 4,352,897 A | 10/1982 | Ogata et al. | |
| 4,362,490 A | 12/1982 | Machida et al. | |
| 4,365,407 A | 12/1982 | Zdaniewski et al. | |
| 4,370,188 A | 1/1983 | Otty | |
| 4,387,311 A | 6/1983 | Kobayashi et al. | |
| 4,399,949 A | 8/1983 | Penn et al. | |
| 4,434,546 A | 3/1984 | Hershberger | |
| 4,456,844 A | 6/1984 | Yamamoto et al. | |
| 4,470,786 A | 9/1984 | Sano et al. | |
| 4,473,716 A | 9/1984 | Jesseman | |
| 4,492,884 A | 1/1985 | Asano et al. | |
| 4,543,708 A | 10/1985 | Matsubara et al. | |
| 4,553,320 A | 11/1985 | Bryant-Jeffries et al. | |
| 4,559,464 A | 12/1985 | Stokes | |
| 4,560,893 A | 12/1985 | van de Griend | |
| 4,602,180 A | 7/1986 | Olson | |
| 4,616,407 A | 10/1986 | Tamaki et al. | |
| 4,624,884 A | 11/1986 | Harada et al. | |
| 4,635,348 A | 1/1987 | Van Zyl | |
| 4,663,835 A | 5/1987 | Caillier, Sr. | |
| 4,682,410 A | 7/1987 | Kreuzer et al. | |
| 4,696,631 A | 9/1987 | Nitt | |
| 4,782,254 A | 11/1988 | Kreuzer et al. | |
| 4,800,315 A | 1/1989 | Schulz et al. | |
| 4,806,806 A | 2/1989 | Hjortsberg et al. | |
| 4,818,910 A | 4/1989 | Reisenweber | |
| 4,823,032 A | 4/1989 | Ward et al. | |
| 4,863,651 A | 9/1989 | Koten | |
| 4,882,510 A | 11/1989 | Newberg | |
| 4,888,508 A | 12/1989 | Adam et al. | |
| 4,908,534 A | 3/1990 | Gubler et al. | |
| 4,908,535 A | 3/1990 | Kreuzer et al. | |
| 4,918,801 A | 4/1990 | Schwarz et al. | |
| 4,922,604 A | 5/1990 | Marshall et al. | |
| 4,938,866 A | 7/1990 | Ward | |
| 4,950,438 A | 8/1990 | Nakamura et al. | |
| 4,963,776 A | 10/1990 | Kitamura | |
| 4,964,210 A | 10/1990 | Takagi | |
| 4,973,872 A | 11/1990 | Dohogne | |
| 4,983,866 A * | 1/1991 | Lok | 310/43 |
| 4,998,448 A | 3/1991 | Ellis, Jr. | |
| 5,003,212 A | 3/1991 | Ibe et al. | |
| 5,019,737 A | 5/1991 | Bruno | |
| 5,038,460 A | 8/1991 | Ide et al. | |
| 5,055,728 A * | 10/1991 | Looper et al. | 310/91 |
| 5,059,370 A | 10/1991 | Kojima | |
| 5,075,585 A | 12/1991 | Teruyama et al. | |
| 5,090,110 A | 2/1992 | Murakoshi et al. | |
| 5,095,612 A | 3/1992 | McAvena | |
| 5,100,311 A | 3/1992 | Clemens et al. | |
| 5,121,021 A | 6/1992 | Ward | |
| 5,130,596 A | 7/1992 | Umeki | |
| 5,137,940 A | 8/1992 | Tomiyoshi et al. | |
| 5,141,768 A | 8/1992 | Ibe et al. | |
| 5,153,263 A | 10/1992 | Liu et al. | |
| 5,199,992 A | 4/1993 | Hines et al. | |
| 5,201,248 A | 4/1993 | Ibe et al. | |
| 5,212,887 A * | 5/1993 | Farmerie | 30/393 |
| 5,233,249 A | 8/1993 | Schaeftlmeier et al. | |
| 5,244,608 A | 9/1993 | Andersen | |
| 5,267,140 A | 11/1993 | Ibe | |
| 5,268,607 A | 12/1993 | McManus | |
| 5,313,698 A | 5/1994 | Schaeftlmeier et al. | |
| 5,329,199 A | 7/1994 | Yockey et al. | |
| 5,331,730 A | 7/1994 | Brinn, Jr. | |
| 5,341,561 A | 8/1994 | Schorm et al. | |
| 5,352,948 A * | 10/1994 | Kirn et al. | 310/214 |
| 5,376,325 A | 12/1994 | Ormson | |
| 5,384,339 A | 1/1995 | Starkey | |
| 5,436,520 A | 7/1995 | Huber | |
| 5,449,963 A * | 9/1995 | Mok | 310/270 |
| 5,459,190 A | 10/1995 | Nakamura et al. | |
| 5,473,213 A | 12/1995 | Kahle, Sr. | |
| 5,477,092 A | 12/1995 | Tarrant | |
| 5,490,319 A | 2/1996 | Nakamura et al. | |
| 5,538,067 A | 7/1996 | Nakamura et al. | |
| 5,567,284 A | 10/1996 | Bauer et al. | |
| 5,572,787 A | 11/1996 | Cardini et al. | |
| 5,584,114 A | 12/1996 | McManus | |
| 5,587,619 A | 12/1996 | Yumiyama et al. | |

| | | |
|---|---|---|
| 5,606,791 A | 3/1997 | Fougere et al. |
| 5,634,258 A | 6/1997 | Onodera et al. |
| 5,639,403 A | 6/1997 | Ida et al. |
| 5,668,428 A | 9/1997 | Stojkovich et al. |
| 5,672,927 A | 9/1997 | Viskochil |
| 5,694,268 A | 12/1997 | Dunfield et al. |
| 5,714,827 A | 2/1998 | Hansson |
| 5,714,828 A | 2/1998 | Ackermann et al. |
| 5,715,590 A | 2/1998 | Fougere et al. |
| 5,727,307 A | 3/1998 | Gstohl et al. |
| 5,731,646 A | 3/1998 | Heinze et al. |
| 5,731,651 A | 3/1998 | Hyodo |
| 5,783,877 A | 7/1998 | Chitayat |
| 5,783,888 A | 7/1998 | Yamano |
| 5,806,169 A | 9/1998 | Trago et al. |
| 5,814,412 A | 9/1998 | Terada et al. |
| 5,821,654 A | 10/1998 | Woo |
| 5,845,389 A | 12/1998 | Roberts et al. |
| 5,880,179 A | 3/1999 | Ito et al. |
| 5,887,643 A | 3/1999 | Nakamura et al. |
| 5,908,883 A | 6/1999 | Caramanian |
| 5,911,685 A | 6/1999 | Siess et al. |
| 5,921,913 A | 7/1999 | Siess |
| 5,937,930 A | 8/1999 | Nakamura et al. |
| 5,955,812 A | 9/1999 | Warner |
| 5,955,813 A | 9/1999 | Bolte et al. |
| 5,960,532 A | 10/1999 | Hill |
| 5,964,694 A | 10/1999 | Siess et al. |
| 5,973,424 A | 10/1999 | Engelberger et al. |
| 5,982,056 A | 11/1999 | Koyama et al. |
| 5,990,247 A | 11/1999 | Terada et al. |
| 5,998,905 A | 12/1999 | Fougere et al. |
| 6,020,661 A | 2/2000 | Trago et al. |
| 6,057,626 A | 5/2000 | Tanaka et al. |
| 6,060,799 A | 5/2000 | McManus et al. |
| 6,063,321 A | 5/2000 | Koyama et al. |
| 6,064,136 A | 5/2000 | Kobayashi et al. |
| 6,075,304 A | 6/2000 | Nakatsuka |
| 6,078,121 A | 6/2000 | Poag et al. |
| 6,137,205 A | 10/2000 | Hung et al. |
| 6,139,487 A | 10/2000 | Siess |
| 6,145,585 A | 11/2000 | Wei |
| 6,166,462 A | 12/2000 | Finkenbinder et al. |
| 6,166,468 A | 12/2000 | Suzuki et al. |
| 6,171,418 B1 | 1/2001 | Caramanian |
| 6,173,915 B1 | 1/2001 | Cohen et al. |
| 6,177,741 B1 | 1/2001 | Lutkenhaus et al. |
| 6,181,038 B1 | 1/2001 | Van Rooij |
| 6,181,042 B1 | 1/2001 | Grant et al. |
| 6,184,600 B1 | 2/2001 | Asao et al. |
| 6,191,508 B1 | 2/2001 | Aoki et al. |
| 6,201,321 B1 | 3/2001 | Mosciatti et al. |
| 6,202,285 B1 | 3/2001 | Bell |
| 6,208,056 B1 | 3/2001 | Perkins |
| 6,214,906 B1 | 4/2001 | Carmanian |
| 6,226,857 B1 | 5/2001 | Becherucci |
| 6,239,519 B1 | 5/2001 | Kaelberer et al. |
| 6,242,825 B1 | 6/2001 | Mori et al. |
| 6,268,678 B1 | 7/2001 | Asao et al. |
| 6,278,206 B1 | 8/2001 | Yockey et al. |
| 6,278,213 B1 | 8/2001 | Bradfield |
| 6,281,612 B1 | 8/2001 | Asao et al. |
| 6,288,341 B1 | 9/2001 | Tsunoda et al. |
| 6,309,579 B1 | 10/2001 | Koyama et al. |
| 6,315,527 B1 | 11/2001 | Makino et al. |
| 6,317,963 B1 | 11/2001 | Powers et al. |
| 6,332,998 B1 | 12/2001 | Yamagata et al. |
| 6,334,972 B1 | 1/2002 | Kim |
| 6,362,554 B1 | 3/2002 | Neal |
| 6,396,189 B1 | 5/2002 | Matsushita et al. |
| 6,404,092 B1 | 6/2002 | Baumann et al. |
| 6,411,188 B1 | 6/2002 | Pruess et al. |
| 6,426,578 B1 | 7/2002 | Mori et al. |
| 6,448,683 B1 | 9/2002 | Wiesler et al. |
| 6,449,830 B1 | 9/2002 | Amada et al. |
| 6,451,230 B1 | 9/2002 | Eckardt et al. |
| 6,462,453 B1 | 10/2002 | Asao et al. |
| 6,477,763 B1 | 11/2002 | Santander et al. |
| 6,531,797 B1 | 3/2003 | Eydelie et al. |
| 6,579,566 B1 | 6/2003 | Moser et al. |
| 6,643,910 B1 | 11/2003 | Kanai et al. |
| 6,645,416 B1 | 11/2003 | Bock et al. |
| 6,651,920 B1 | 11/2003 | Sedgewick et al. |
| 6,661,137 B1 | 12/2003 | Gauthier et al. |
| 6,673,463 B1 | 1/2004 | Onishi et al. |
| 6,683,397 B1 | 1/2004 | Gauthier et al. |
| 2001/0045687 A1 | 11/2001 | Baumann et al. |
| 2001/0048261 A1 | 12/2001 | Kojima et al. |
| 2002/0017732 A1 | 2/2002 | Koyama et al. |
| 2002/0047425 A1 | 4/2002 | Coupart et al. |
| 2002/0148099 A1 | 10/2002 | Eydelie et al. |
| 2002/0148100 A1 | 10/2002 | Du |
| 2002/0149281 A1 | 10/2002 | Saint-Michel et al. |
| 2002/0171305 A1 | 11/2002 | Coupart et al. |
| 2003/0033709 A1 | 2/2003 | Bradfield |
| 2003/0160523 A1 | 8/2003 | Suzuki et al. |

FOREIGN PATENT DOCUMENTS

| | | |
|---|---|---|
| DE | 32 11 716 | 10/1983 |
| DE | 34 41 440 | 5/1985 |
| DE | 1 966 275 | 8/1987 |
| DE | 37 07 682 | 9/1988 |
| DE | 40 21 591 | 1/1992 |
| DE | 41 32 982 | 4/1993 |
| DE | 43 30 323 | 3/1995 |
| DE | 195 24 431 | 1/1997 |
| DE | 195 43 919 | 4/1997 |
| DE | 195 42 564 | 5/1997 |
| DE | 198 18 105 | 10/1999 |
| DE | 198 34 085 | 11/1999 |
| DE | 198 34 086 | 1/2000 |
| DE | 199 23 886 | 1/2000 |
| DE | 199 39 760 | 3/2001 |
| DE | 199 60 088 | 3/2001 |
| EP | 0 001 222 | 4/1979 |
| EP | 0 379 012 | 7/1990 |
| EP | 91909297.3 | 5/1991 |
| EP | 0 489 363 | 6/1992 |
| EP | 93101340.3 | 1/1993 |
| EP | 0 549 923 | 7/1993 |
| EP | 96909912.6 | 4/1996 |
| EP | 0 762 602 | 3/1997 |
| EP | 0 865 146 | 9/1998 |
| EP | 0 942 512 | 9/1999 |
| FR | 1 137 505 | 5/1957 |
| GB | 2 032 708 | 5/1980 |
| JP | 59-053064 | 3/1984 |
| JP | 05-060172 | 3/1993 |
| JP | 10-174384 | 6/1998 |
| JP | 11-299190 | 10/1999 |
| JP | 2002-044916 | 2/2002 |
| JP | 2002-247813 | 8/2002 |
| JP | 2002-535954 | 10/2002 |
| JP | 2003-134714 | 5/2003 |
| JP | 2003-274592 | 9/2003 |
| WO | PCT/DE96/01489 | 2/1997 |

OTHER PUBLICATIONS

International Search Report—PCT/US01/44902; ISA/EPO, Feb. 25, 2002.

* cited by examiner

METHOD FOR FORMING AN ARMATURE FOR AN ELECTRIC MOTOR FOR A PORTABLE POWER TOOL

CROSS REFERENCE TO RELATED APPLICATIONS

This application is a divisional of U.S. application Ser. No. 09/836,517 filed Apr. 17, 2001 (abandoned), which is a continuation-in-part of U.S. application Ser. No. 09/756,959 filed Jan. 9, 2001 (abandoned).

TECHNICAL FIELD

This invention relates to electric motors, and more particularly to an electric motor having an armature which is at least structurally encased within a thermally conductive plastic, and wherein a fan is integrally formed from a portion of the thermally conductive plastic at one end of the armature.

BACKGROUND OF THE INVENTION

Electric motors are used in a wide variety of applications involving power tools such as drills, saws, sanding and grinding devices, yard tools such as edgers and trimmers, just to name a few such tools. These devices all make use of electric motors having an armature and a stator. The armature is typically formed from a lamination stack around which a plurality of windings of magnet wires are wound. The magnet wires are coupled at their ends to tangs on a commutator disposed on an armature shaft extending coaxially through the lamination stack. The ends of the magnet wires are secured to the commutator.

In the manufacturing process for the armature described above, once the magnet wires have been secured to the commutator, a "trickle" resin is applied over the magnet wires and over the ends of the magnet wires where they attach to tangs associated with the commutator. The process of applying the trickle resin is a somewhat difficult process to manage to obtain consistent results. It also has a number of drawbacks, not the least of which is the cost and difficulty of performing it with reliable, consistent results.

Initially, the trickle process requires the use of a relatively large and expensive oven to carefully preheat the partially assembled armatures to relatively precise temperatures before the trickle resin can be applied. The temperature of the trickle resin also needs to be carefully controlled to achieve satisfactory flow of the resin through the slots in the lamination stack of the armature. It has proven to be extremely difficult to achieve consistent, complete flow of the trickle resin through the slots in the lamination stack. As such, it is difficult to achieve good flow inbetween the magnet wires with the trickle resin to satisfactorily insulate the magnet wires from one another and hold them stationary relative to each other. A cooling period must then be allowed during which air is typically forced over the armatures to cool them before the next manufacturing step is taken. Further complicating the manufacturing process is that the trickle resin typically has a short shelf life, and therefore must be used within a relatively short period of time.

With present day manufacturing techniques, an additional or secondary coating of a higher viscosity trickle resin is often required to protect the armature (and specifically the magnet wires) from abrasive metal particles that are drawn in and over the armature by the armature's fan when the armature is used in connection with various grinders and sanders. This serves to further increase the manufacturing cost and complexity of the armature.

Still another drawback with the trickle process is the relatively high number of armatures which are often rejected because of problems encountered during the process of applying the trickle resin to an otherwise properly constructed armature. Such problems can include contamination of the commutator of the armature by the trickle resin during the application process, as well as uneven flow of the trickle resin if the pump supplying the resin becomes momentarily clogged. Accordingly, the difficulty in controlling the trickle resin application process produces a relatively large scrap rate which further adds to the manufacturing cost of electric motors.

Still another disadvantage with present day electric motors is that the fan which is typically attached at one end of the armature is a separately formed component which must be glued or otherwise secured to the armature in a separate manufacturing step. This fan also is typically the first component to fail if the motor is stressed. This occurs when the fan simply melts due to overheating of the motor. The use of a separately formed component also takes up additional space on the armature which increases the overall size of the armature.

In view of the foregoing, it would be highly desirable to eliminate the steps of applying the trickle resin and securing a separately formed fan to an armature. More specifically, it would be highly desirable if these two steps could be replaced by a single step which achieves the object of more thoroughly coating the magnet wires of the armature with a thermally conductive material, in addition to forming an integrally formed fan, all with a single manufacturing step.

SUMMARY OF THE INVENTION

The present invention is directed to an armature for an electric motor which includes a thermally conductive coating applied over the magnet wires wound around the lamination stack thereof, to thereby form an excellent means for dissipating heat and holding the magnet wires stationary as well as holding the ends of the magnet wires secured to tangs on the commutator. It is also a principal object of the present invention to provide a fan which is integrally molded at one end of the armature from the thermally conductive plastic in a single manufacturing step. The integrally molded fan better resists the extreme temperatures that may be encountered if the motor is stressed during use.

In one preferred embodiment the thermally conductive plastic is applied by a well known injection molding process. As such, the need for a trickle oven and the difficult to manage application of the trickle resin is completely eliminated.

The integrally formed fan is formed when the armature is placed into a suitable molding tool during the injection molding process. The resulting injection molded fan is much more resistant to high temperatures that may be encountered during use of the armature with which it is associated, and further requires less space than previously formed, independent fan components. The smaller fan allows the overall dimensions of the armature to be reduced thereby allowing a smaller motor to be formed for a given ampere rating. Forming the fan integrally with the thermally conductive plastic which coats the magnet wires also eliminates the need to insert portions of the fan into the slots in the lamination stack. This allows more room within the slots in the lamination stack for the magnet wires which allows the power rating of the motor to be increased beyond what would normally be attainable with a conventionally attached and independently formed fan component.

In a preferred embodiment the thermally conductive plastic is intermixed, prior to applying it to the armature, with a suitable compound such that the plastic has essentially the same density as the magnet wires. Thus, when each armature slot is filled with the thermally conductive plastic during the molding step, the weight of material (i.e., both magnet wires and plastic) in each armature slot will be essentially the same. This provides the significant benefit that the armature does not have to be balanced prior to being assembled to form a motor. Eliminating the balancing step represents a significant manufacturing savings because no armature balancing equipment needs to be provided in the assembly area. The manual labor associated with setting up each armature to be balanced on the balancing equipment is also eliminated.

The armature of the present invention thus significantly reduces the complexity and cost of the manufacturing process by completely eliminating the steps involving the application of trickle resin and the attachment of a separately formed fan component, which are two of the most expensive and cumbersome manufacturing steps performed with present day electric motors. The requirement of balancing the armature prior to assembling it into a motor is also eliminated by mixing the plastic with a compound that provides essentially the same density as the magnet wires.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
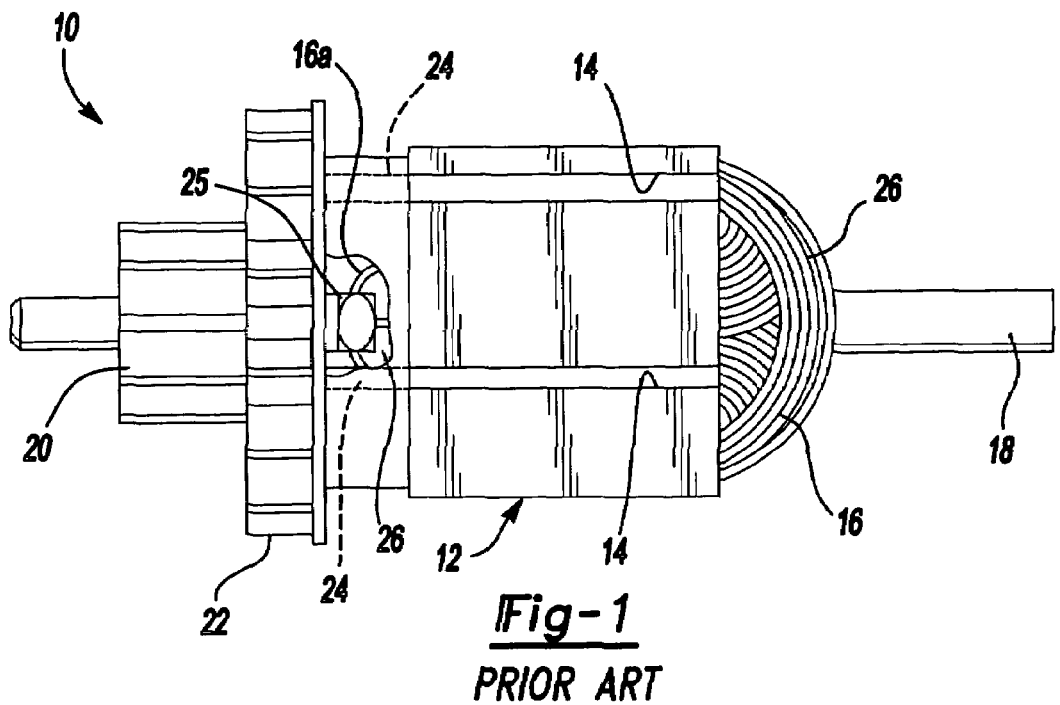
FIG. 1 is a side elevation view of a prior art armature which incorporates the conventional trickle resin coating and separately manufactured fan secured by adhesives to the armature.

Referring to FIG. 1, there is illustrated a prior art armature 10 made in accordance with a conventional manufacturing process incorporating the trickle resin application steps described hereinbefore. The armature 10 incorporates a lamination stack 12 having a plurality of longitudinal slots 14 disposed circumferentially therearound. Wound within the slots 14 is a large plurality of magnet wires 16 forming coils. An armature shaft 18 extends coaxially through the lamination stack 12 and includes a commutator 20. An independently formed plastic fan 22 is secured, typically by adhesives, to the lamination stack 14. The fan 22 typically includes a plurality of legs 24 which project into the slots 14, thus taking up space which would more preferably be occupied by the magnet wires 16. Trickle resin 26 is applied over the magnet wires 16, in the slots 14, and also at the tangs 25 where the ends of the magnet wires 16a attach to the commutator 20.

Figure 2:
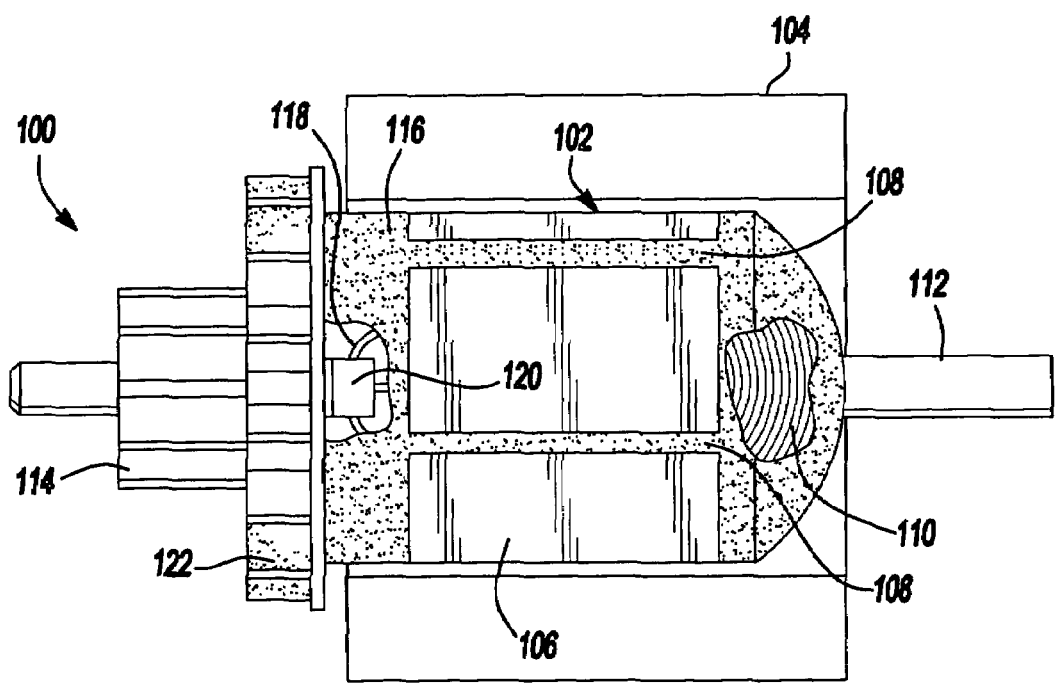
FIG. 2 is a side elevation view of an armature in accordance with a preferred embodiment of the present invention.

Referring now to FIG. 2, a motor 100 in accordance with a preferred embodiment of the present invention is disclosed. The motor 100 includes an armature 102 and a stator 104, the stator being illustrated in highly simplified fashion. The armature 102 incorporates a lamination stack 106 having a plurality of longitudinal slots 108 arranged circumferentially therearound. A plurality of magnet wires 110 are wound in the slots 108 to form a plurality of coil windings. An armature shaft 112 extends coaxially through the lamination stack 106 and has disposed on one end thereof a commutator 114. A thermally conductive plastic coating 116 is injection molded over the armature 102 so that the plastic flows into and through each of the slots 108. The thermally conductive plastic coating 116 is applied by placing the armature 102 in a suitable injection molding tool and then injecting the thermally conductive plastic 116 under a suitably high pressure into the molding tool. The thermally conductive plastic 116 preferably at least partially encases the magnet wires 110, and more preferably completely encases the magnet wires to form an excellent means for transferring heat therefrom. The plastic 116 also encases the ends 118 of the magnet wires 110 which are secured to tangs 120 operably associated with the commutator 114.

A principal advantage of the present invention is that a fan 122 is also integrally formed during the molding of the thermally conductive plastic 116 at one end of the lamination stack 106. Forming the fan 122 as an integral portion of the thermally conductive plastic 116 serves to completely eliminate the manufacturing steps in which a trickle resin is applied to the lamination stack 106 and then a separately formed fan is adhered to the lamination stack 106.

The molding of the thermally conductive plastic 116 to substantially or completely encase the magnet wires 110 serves to efficiently conduct heat away from the magnet wires and also to more evenly fill the gaps inbetween the magnet wires where they extend in the slots 108. Thus, the thermally conductive plastic 116 even more efficiently serves to secure the magnet wires 110 to the lamination stack 106 to prevent movement of the wires, as well as to secure the magnet wires to the tangs 120 and to improve the conduction of heat from the wires.

The molding of the fan 122 as an integral portion of the thermally conductive plastic coating 116 also provides a significant manufacturing benefit by removing the cost associated with separately forming such a fan component and then securing the component via an adhesive to the lamination stack 106. This allows the fan 122 to be constructed even more compactly against the lamination stack 106 which allows a motor to be constructed which requires less space than previously developed motors employing independently formed fans.

In the preferred embodiment the thermally conductive plastic coating 116 comprises Konduit® thermoplastic commercially available from LNP Engineering Plastics of Exton, Pa. However, it will be appreciated that any material which could be injection molded and which is thermally conductive could be used.

Another advantage of having the fan 122 molded from the thermally conductive plastic is that the fan will be even more resistant to high temperatures which might be encountered during use which stresses the motor 100. With previously developed motors, the fan mounted to the armature thereof is often the first component to fail because of high temperatures encountered during periods of high stress of the motor. The armature 100 of the present invention, with its integrally molded fan 122, is significantly more resistant to failure due to high temperatures.

The injection molding of a thermally conductive plastic also more efficiently fills the spaces and voids inbetween the magnet wires 110 extending through the lamination stack slots 108, thus promoting even more efficient cooling of the armature 102 during use. The increase in heat transfer is expected to allow even larger gauge magnet wires 110 to be employed on a given size armature, thus increasing the amp rating which can be attained with a motor of given dimensions over a comparably sized motor employing trickle resin sealing of the magnet wires.

With the armature 100, the thermally conductive plastic 116 may comprise a high temperature nylon or thermoset plastic which is further mixed with a suitable non-ferromagnetic material such as ceramic, aluminum or copper, to provide essentially the same density as that of the magnet wires 110. Thus, when each of the lamination stack slots 108 are completely filled with the plastic 116 and the magnet wires 110, the weight of the material filling each slot 108 is essentially the same. Since the weight of the material filling each slot 108 is essentially the same, the need to balance the armature on a balancing machine, after the molding step, is eliminated. Eliminating the balancing step represents a substantial cost savings because no longer is the use of a balancing machine required, as well as the manual labor of setting each of the armatures up on the balancing machine. Instead, once the armatures have cooled after the injection molding process, the armatures can proceed to the assembly stage where they are assembled with other components to form motors. LNP Plastics Engineering is a source of specifically formulated plastics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for forming an electric motor for a portable power tool, comprising:
    providing a stator;
    providing an armature having a plurality of magnet wires therearound;
    molding a plastic over at least a portion of the magnet wires without having applied a trickle resin to the magnet wires to at least partially encase the magnet wires in the plastic, said plastic having a density substantially the same as said magnet wires, substantially eliminating balancing of said armature, and forming the electric motor for a portable power tool; and
    assembling the motor into a portable power tool.

2. The method of claim 1 wherein molding the plastic comprises injection molding the plastic.

3. The method of claim 2 wherein the armature has slots in which the magnet wires are wound and a commutator to which the magnet wires are attached, and injection molding the plastic includes injection molding the plastic over the magnet wires where they attach to the commutator of the armature and over the magnet wires in the slots in the armature.

4. The method of claim 3 wherein the plastic is a thermally conductive plastic.

5. The method of claim 4 where molding the plastic further includes molding a fan at one end of the armature.

6. The method of claim 1 wherein the plastic comprises a mixture of plastic and a secondary material, the mixture having a density approximately equal to a density of the magnet wires.

7. A method for forming an armature for an electric motor for a portable power tool, comprising:
    securing a lamination stack having slots therein on an armature shaft;
    securing a commutator on one end of the armature shaft;
    winding magnet wires in the slots in the lamination stack and securing ends of the magnet wires to the commutator;
    placing said armature shaft with said magnet wires and laminate stack in a die;
    molding plastic over the magnet wires without having applied a trickle resin to the magnet wires, to at least partially encase the magnet wires and the ends of the wires associated with the commutator in the plastic providing a continuous plastic molding from end to end of the magnet wires, removing said molding from said die, and forming the electric motor for a portable power tool; and
    assembling the motor into a portable power tool.

8. The method of claim 7 wherein molding the plastic comprises injection molding the plastic.

9. The method of claim 8 wherein injection molding the plastic includes injection molding the plastic over the magnet wires in the slots of the lamination stack and over the ends of the magnet wires where they are secured to the commutator.

10. The method of claim 9 wherein the plastic is a thermally conductive plastic.

11. The method of claim 10 wherein molding the plastic further includes molding a fan at one end of the armature.

12. A method for forming an armature for an electric motor for a portable power tool, comprising:
    securing a lamination stack having slots therein on an armature shaft;
    securing a commutator on one end of the armature shaft;
    winding magnet wires in the slots in the lamination stack and securing ends of the magnet wires to the commutator; and
    molding plastic over the magnet wires without having applied a trickle resin to the magnet wires to at least partially encase the magnet wires in the plastic wherein the plastic is a mixture of plastic and particles of non-ferromagnetic material having a density substantially equal to a density of the magnet wires to eliminate the need to dynamically balance the armature.

* * * * *